US012623378B2

(12) United States Patent
Lee et al.

(10) Patent No.: US 12,623,378 B2
(45) Date of Patent: May 12, 2026

(54) APPARATUS AND METHOD FOR MANUFACTURING DISPLAY APPARATUS

(71) Applicant: Samsung Display Co., Ltd., Yongin-si (KR)

(72) Inventors: Hyunwoo Lee, Yongin-si (KR); Jinhee Bae, Yongin-si (KR); Junhyeong Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 210 days.

(21) Appl. No.: 18/342,528

(22) Filed: Jun. 27, 2023

(65) Prior Publication Data

US 2024/0042656 A1 Feb. 8, 2024

(30) Foreign Application Priority Data

Aug. 2, 2022 (KR) ........................ 10-2022-0096268

(51) Int. Cl.
*B29C 39/10* (2006.01)
*B29C 35/08* (2006.01)
*B29L 31/34* (2006.01)

(52) U.S. Cl.
CPC .......... *B29C 39/10* (2013.01); *B29C 35/0805* (2013.01); *B29C 2035/0827* (2013.01); *B29L 2031/3475* (2013.01)

(58) Field of Classification Search
CPC ........ B29C 2045/0075; B29C 35/0266; B29C 35/0288; B29C 35/0805; B29C 39/10; B29C 39/142; B29C 39/18; B29C 65/1448
See application file for complete search history.

(56) References Cited

U.S. PATENT DOCUMENTS 11,017,716 B2 5/2021 Kim
2022/0344603 A1 10/2022 Um et al.

FOREIGN PATENT DOCUMENTS

| JP | 2004-225003 A | | 8/2004 |
| JP | 1251094 | * | 3/2006 |
| KR | 10-2014-0118676 A | | 10/2014 |
| KR | 10-2018-0035982 A | | 4/2018 |
| KR | 10-2018-0039844 A | | 4/2018 |
| KR | 10-2019-0119244 A | | 10/2019 |
| KR | 20190119244 | * | 10/2019 |

* cited by examiner

*Primary Examiner* — Stella K Yi
(74) *Attorney, Agent, or Firm* — Womble Bond Dickinson (US) LLP

(57) ABSTRACT

In an apparatus for manufacturing a display apparatus, the apparatus includes: a display panel comprising a display area, an adjacent area surrounding the display area, and a bending area extending from a side of the adjacent area, the display panel comprising a first material in the adjacent area and a second material in the bending area; a stage on which the display panel is located; and a curing device configured to concurrently cure the first material and the second material.

9 Claims, 13 Drawing Sheets

APPARATUS AND METHOD FOR MANUFACTURING DISPLAY APPARATUS

CROSS-REFERENCE TO RELATED APPLICATION

The present application claims priority to and the benefit of Korean Patent Application No. 10-2022-0096268, filed on Aug. 2, 2022, in the Korean Intellectual Property Office, the entire disclosure of which is incorporated herein by reference.

BACKGROUND

1. Field

Aspects of one or more embodiments relate to an apparatus and method for manufacturing a display apparatus.

2. Description of the Related Art

Recently, electronic devices have been widely used. Electronic devices have been variously used as mobile electronic devices and fixed electronic devices. Such electronic devices include display apparatuses that may provide a user with visual information such as images or videos to support various functions.

Recently, as other components for driving a display apparatus have been miniaturized, the proportion of the display apparatus in an electronic device has gradually increased, and a structure that is bendable from a flat state to have a certain angle or is foldable about an axis has been developed.

In general, a display apparatus includes a display panel, and the display panel includes a display area where an image is displayed and a peripheral area that is a non-display area adjacent to the display area. In the display panel, visibility at various angles may be improved or the area of the non-display area may be reduced by bending at least a part of the peripheral area.

The above information disclosed in this Background section is only for enhancement of understanding of the background and therefore the information discussed in this Background section does not necessarily constitute prior art.

SUMMARY

Aspects of one or more embodiments include an apparatus and method for manufacturing a display apparatus in which a time of a manufacturing process may be relatively reduced by respectively applying materials to an adjacent area and a bending area of a display panel and then simultaneously (or concurrently) curing the applied materials. However, the above-described characteristics are only examples according to some embodiments, and do not limit the scope of embodiments according to the present disclosure.

Additional aspects will be set forth in part in the description which follows and, in part, will be apparent from the description, or may be learned by practice of the presented embodiments.

According to one or more embodiments, an apparatus for manufacturing a display apparatus includes a display panel including a display area, an adjacent area surrounding the display area, and a bending area extending from a side of the display area, the display panel including a first material located in the adjacent area and a second material located in the bending area, a stage on which the display panel is located, and a curing device configured to simultaneously (or concurrently) cure the first material and the second material.

According to some embodiments, the display panel may further include a dam located in at least a part of the adjacent area and at least a part of the bending area.

According to some embodiments, the dam may include a same material as the second material.

According to some embodiments, the first material may cover a top surface of the display panel so that the top surface of the display panel in the adjacent area is not exposed.

According to some embodiments, the first material in the adjacent area may be cured to form an organic material layer.

According to some embodiments, the second material in the bending area may be cured to form a bending protective layer.

According to some embodiments, a wavelength band of light irradiated by the curing device may be equal to or greater than 365 nm and equal to or less than 405 nm.

According to some embodiments, an irradiation amount of light irradiated by the curing device may be determined so that a curing rate of the first material in the adjacent area and the second material in the bending area at a deep portion and a surface is equal to or greater than 80%.

According to some embodiments, the curing device may include a first curing device configured to cure the first material in the adjacent area and a second curing device configured to cure the second material in the bending area, wherein the first curing device and the second curing device are spaced apart from each other in a first direction.

According to some embodiments, a wavelength band of light irradiated by each of the first curing device and the second curing device may be equal to or greater than 365 nm and equal to or less than 405 nm.

According to some embodiments, an irradiation amount of light irradiated by the first curing device and the second curing device may be determined so that a curing rate of the first material in the adjacent area and the second material in the bending area at a deep portion and a surface is equal to or greater than 80%.

According to one or more embodiments, a method of manufacturing a display apparatus includes locating, on a stage, a display panel including a display area, an adjacent area surrounding the display area, and a bending area extending from a side of the adjacent area, forming a dam in at least a part of the adjacent area and at least a part of the bending area, applying a first material to the adjacent area, applying a second material to the bending area, and simultaneously (or concurrently) curing the first material and the second material.

According to some embodiments, the dam may include a same material as the second material.

According to some embodiments, the applying of the first material to the adjacent area may include covering a top surface of the display panel with the first material so that the top surface of the display panel in the adjacent area is not exposed.

According to some embodiments, the first material and the second material may be simultaneously (or concurrently) cured by one curing device.

According to some embodiments, a wavelength band of light irradiated by the curing device may be equal to or greater than 365 nm and equal to or less than 405 nm.

According to some embodiments, an irradiation amount of light irradiated by the curing device may be determined so that a curing rate of the first material in the adjacent area and the second material in the bending area at a deep portion and a surface is equal to or greater than 80%.

According to some embodiments, the first material may be cured by a first curing device and the second material is cured by a second curing device.

According to some embodiments, the first curing device and the second curing device may be spaced apart from each other in a first direction.

According to some embodiments, a wavelength band of light irradiated by the first curing device and the second curing device may be equal to or greater than 365 nm and equal to or less than 405 nm, wherein an irradiation amount of light irradiated by the first curing device and the second curing device is determined so that a curing rate of the first material and the second material at a deep portion and a surface is equal to or greater than 80%.

BRIEF DESCRIPTION OF THE DRAWINGS

The above and other aspects, features, and characteristics of certain embodiments will be more apparent from the following description taken in conjunction with the accompanying drawings, in which:

FIGS. 7 and 8 are cross-sectional views schematically illustrating an apparatus for manufacturing a display apparatus, according to some embodiments; and FIGS. 9 through 13 are cross-sectional views schematically illustrating a method of manufacturing a display apparatus, according to some embodiments.

DETAILED DESCRIPTION

Figure 1:
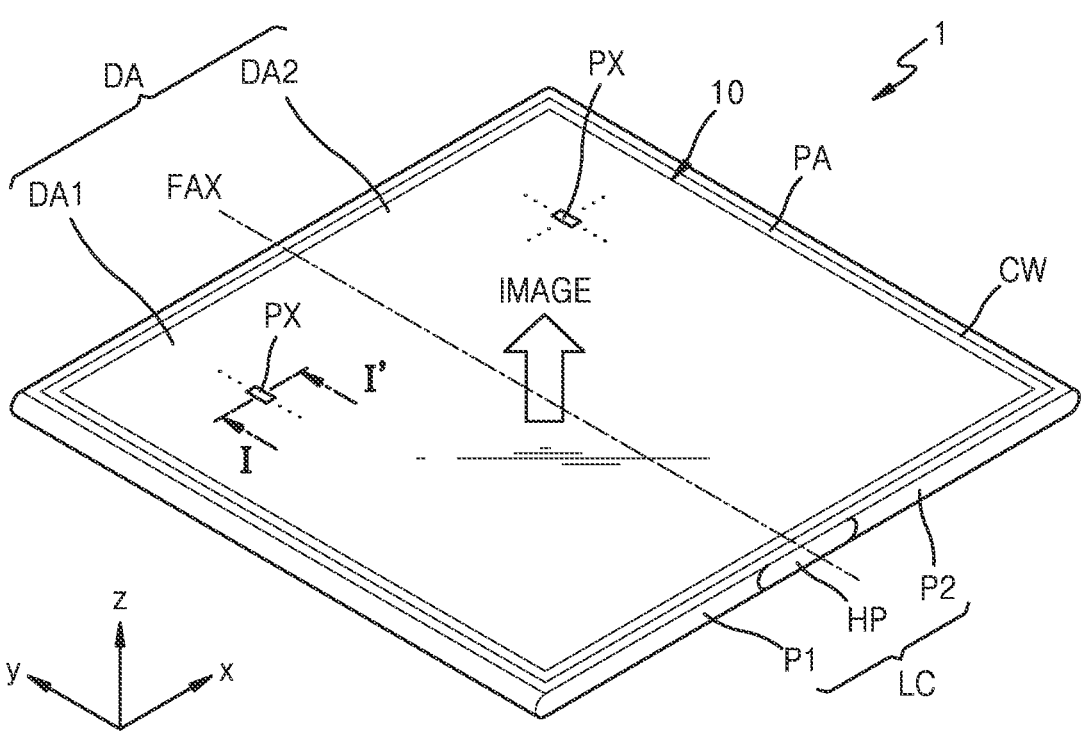
FIGS. 1 and 2 are perspective views schematically illustrating a display apparatus, according to some embodiments.

Reference will now be made in more detail to aspects of some embodiments, which are illustrated in the accompanying drawings, wherein like reference numerals refer to like elements throughout. In this regard, the present embodiments may have different forms and should not be construed as being limited to the descriptions set forth herein. Accordingly, aspects of some embodiments are described below, by referring to the figures, to explain aspects of some embodiments of the present description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

As the disclosure allows for various changes and numerous embodiments, certain embodiments will be illustrated in the drawings and described in the detailed description. Effects and features of the disclosure, and methods for achieving them will be clarified with reference to embodiments described below in more detail with reference to the drawings. However, embodiments according to the present disclosure are not limited to the following characteristics and may be embodied in various forms.

Hereinafter, aspects of some embodiments will be described in more detail with reference to the accompanying drawings, wherein the same or corresponding elements are denoted by the same reference numerals throughout and a repeated description thereof is omitted.

Although the terms "first," "second," etc. may be used to describe various elements, these elements should not be limited by these terms. These terms are only used to distinguish one element from another.

As used herein, the singular forms "a," "an," and "the" are intended to include the plural forms as well, unless the context clearly indicates otherwise.

It will be understood that the terms "including," "having," and "including" are intended to indicate the existence of the features or elements described in the specification, and are not intended to preclude the possibility that one or more other features or elements may exist or may be added.

It will be further understood that, when a layer, region, or component is referred to as being "on" another layer, region, or component, it may be directly on the other layer, region, or component, or may be indirectly on the other layer, region, or component with intervening layers, regions, or components therebetween.

Sizes of components in the drawings may be exaggerated or contracted for convenience of explanation. For example, because sizes and thicknesses of elements in the drawings are arbitrarily illustrated for convenience of explanation, embodiments according to the present disclosure are not limited thereto.

When a certain embodiment may be implemented differently, a specific process order may be different from the described order. For example, two consecutively described processes may be performed substantially at the same time or may be performed in an order opposite to the described order.

"A and/or B" is used herein to select only A, select only B, or select both A and B. "At least one of A and B" is used to select only A, select only B, or select both A and B.

It will be understood that when a layer, an area, or an element is referred to as being "connected" to another layer, area, or element, it may be "directly connected" to the other layer, area, or element and/or may be "indirectly connected" to the other layer, area, or element with other layers, areas, or elements interposed therebetween. For example, when a layer, an area, or an element is referred to as being "electrically connected," it may be directly electrically connected, and/or may be indirectly electrically connected with intervening layers, areas, or elements therebetween.

The x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

Figure 2:
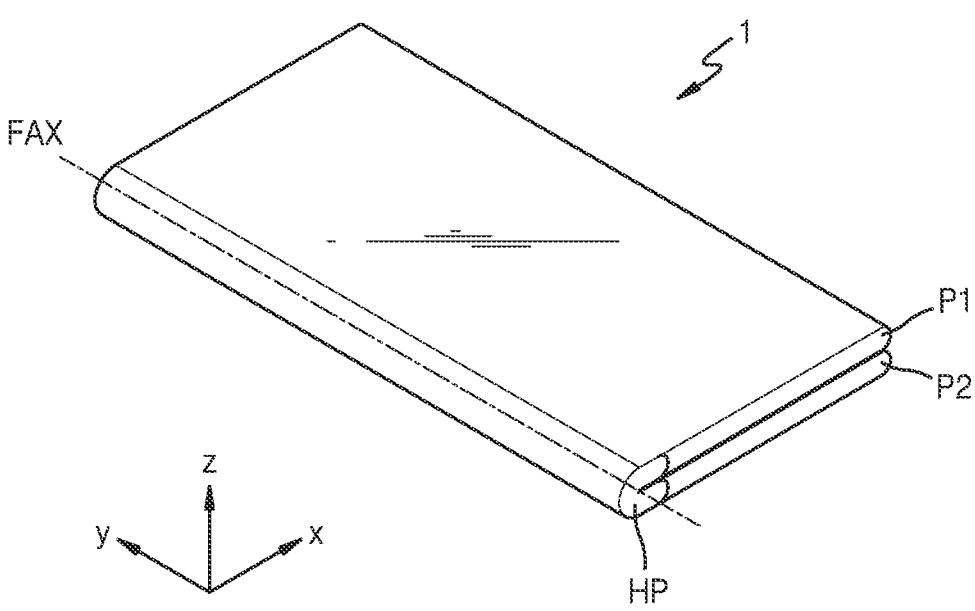

FIGS. 1 and 2 are perspective views schematically illustrating a display apparatus 1, according to some embodiments. For example, FIG. 1 illustrates a state in which the display apparatus 1 is unfolded. FIG. 2 illustrates a state in which the display apparatus 1 is folded.

Referring to FIGS. 1 and 2, the display apparatus 1 for displaying a moving image or a still image may be used as a display screen of not only a portable electronic device such as a mobile phone, a smartphone, a tablet personal computer (PC), a mobile communication terminal, an electronic organizer, an electronic book, a portable multimedia player (PMP), a navigation device, or an ultra-mobile PC (UMPC) but also any of various products such as a television, a laptop computer, a monitor, an advertisement board, or an Internet of things (IoT) product.

Also, the display apparatus 1 according to some embodiments may be used in a wearable device such as a smart watch, a watch phone, a glasses-type display, or a head-mounted display (HMD). Also, the display apparatus 1 according to some embodiments may be used as a center information display (CID) located on an instrument panel, a center fascia, or a dashboard of a vehicle, a room mirror display replacing a side-view mirror of a vehicle, or a display located on the back of a front seat for entertainment for a back seat of a vehicle.

The display apparatus 1 may have a substantially rectangular shape as shown in FIG. 1. For example, as shown in FIG. 1, the display apparatus 1 may have a substantially rectangular planar shape with a short side extending in a first direction (e.g., an x direction or a −x direction) and a long side extending in a second direction (e.g., a y direction or a −y direction). According to some embodiments, a portion where the short side extending in the first direction (e.g., the x direction or the −x direction) and the long side extending in the second direction (e.g., the y direction or the −y direction) meet each other may have a right-angular shape or a round shape with a certain curvature. A planar shape of the display apparatus 1 is not limited to a rectangular shape, and may be another polygonal shape, a circular shape, an elliptical shape, or any other suitable shape according to the design of the display apparatus 1.

The display apparatus 1 may include a lower cover LC, a display panel 10, and a cover window CW. The lower cover LC may form an outer appearance of a bottom surface of the display apparatus 1. The lower cover LC may include plastic, a metal, or both plastic and a metal. The lower cover LC may include a first portion P1 and a second portion P2 supporting the display panel 10. The lower cover LC may be folded about a folding axis FAX defined between the first portion P1 and the second portion P2. According to some embodiments, the lower cover LC may further include a hinge portion HP, and the hinge portion HP may be provided between the first portion P1 and the second portion P2.

The display panel 10 may include a display area DA and a peripheral area PA. The display area DA may display an image. In this case, pixels PX may be located in the display area DA. The display panel 10 may provide an image by using light emitted from the pixels PX. Each pixel PX may emit light by using a display element. According to some embodiments, each pixel PX may emit red light, green light, or blue light. According to some embodiments, each pixel PX may emit red light, green light, blue light, or white light.

The peripheral area PA may be a non-display area where an image is not provided. The peripheral area PA may at least partially surround the display area DA. For example, the peripheral area PA may entirely surround the display area DA. A driver for providing an electrical signal or a power supply wiring for supplying power to the pixels PX may be located in the peripheral area PA. For example, a scan driver for applying a scan signal to the pixels PX may be located in the peripheral area PA. Also, a data driver for applying a data signal to the pixels PX may be located in the peripheral area PA.

The display area DA may include a first display area DA1 and a second display area DA2 located on both sides of the folding axis FAX crossing the display area DA. The first display area DA1 and the second display area DA2 may be respectively located on the first portion P1 and the second portion P2 of the lower cover LC. The display panel 10 may provide a first image and a second image by using light emitted by the plurality of pixels PX located in the first display area DA1 and the second display area DA2. According to some embodiments, the first image and the second image may be portions of any one image provided through the display area DA of the display panel 10. Alternatively, according to some embodiments, the display panel 10 may provide the first image and the second image that are independent of each other.

The display panel 10 may be folded about the folding axis FAX. According to some embodiments, when the display panel 10 is folded, the first display area DA1 and the second display area DA2 of the display panel 10 may face each other. Alternatively, when the display panel 10 is folded, the first display area DA1 and the second display area DA2 of the display panel 10 may face in opposite directions.

That is, the display panel 10 may be in-folded or out-folded about the folding axis FAX. Here, in-folding may mean that the display panel 10 is folded in a +z direction about the folding axis FAX, and out-folding may mean that the display panel 10 is folded in a −z direction about the folding axis FAX. In other words, in-folding may mean that the display panel 10 is folded so that top surfaces of the cover window CW located on the display panel 10 face each other, and out-folding may mean that the display panel 10 is folded so that bottom surfaces of the cover window CW face each other. In this case, the bottom surfaces of the cover window CW may refer to surfaces closer to a substrate 100 (see FIG. 3) in the z direction than the top surfaces of the cover window CW.

Although the folding axis FAX extends in the second direction (e.g., the y direction or the −y direction) in FIGS. 1 and 2, the disclosure is not limited thereto. According to some embodiments, the folding axis may extend in the first direction (e.g., the x direction or the −x direction) intersecting the second direction (e.g., the y direction or the −y direction). Alternatively, in an xy plane, the folding axis FAX may extend in a direction intersecting the first direction (e.g., the x direction or the −x direction) and the second direction (e.g., the y direction or the −y direction).

Also, although only one folding axis FAX is illustrated in FIGS. 1 and 2, the disclosure is not limited thereto. According to some embodiments, the display panel 10 may be folded about two folding axes FAX crossing the display area DA. For example, when the display panel 10 is folded about two folding axes FAX, the display panel 10 may be in-folded about one folding axis FAX and may be out-folded about the remaining folding axis FAX. Alternatively, the display panel 10 may be in-folded or out-folded about two folding axes FAX. According to some embodiments, the display panel 10 may be folded about a plurality of folding axes FAX crossing the display area DA. In this case, the display panel 10 may be in-folded or out-folded about each of the folding axes FAX.

The cover window CW may be located on the display panel 10 and may cover the display panel 10. The cover window CW may be folded or bent by an external force without a crack. When the display panel 10 is folded about the folding axis FAX, the cover window CW may also be folded and may cover the display panel 10.

Figure 3:
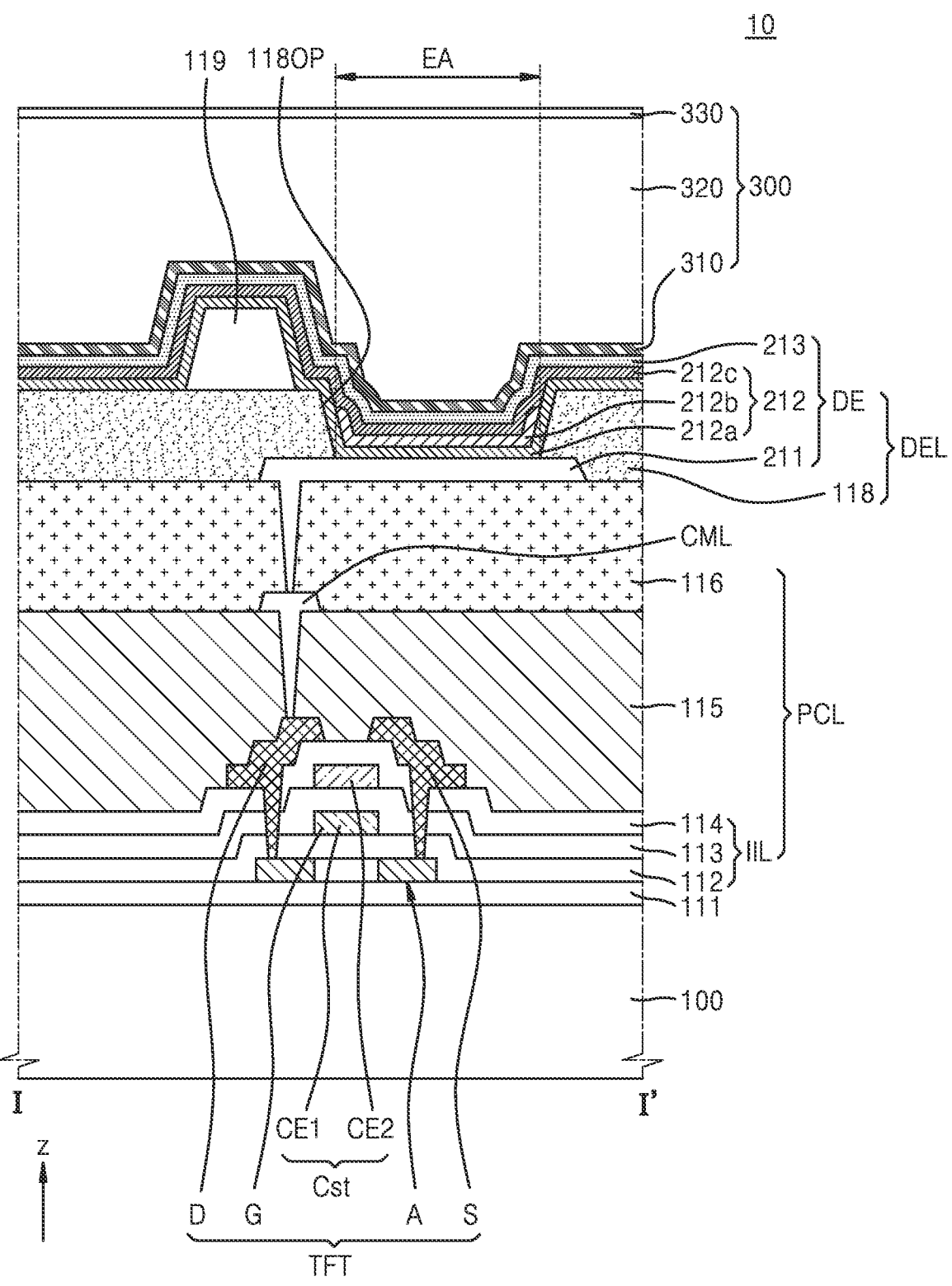
FIG. 3 is a cross-sectional view schematically illustrating a display panel, according to some embodiments.

FIG. 3 is a cross-sectional view schematically illustrating the display panel 10, according to some embodiments. For example, FIG. 3 is a cross-sectional view taken along the line I-I' of FIG. 1.

Referring to FIG. 3, the display panel 10 may include the substrate 100, a buffer layer 111, a pixel circuit layer PCL, a display element layer DEL, and an encapsulation layer 300.

The substrate 100 may include glass or a polymer resin such as polyethersulfone, polyarylate, polyetherimide, polyethylene naphthalate, polyethylene terephthalate, polyphenylene sulfide, polyimide, polycarbonate, cellulose triacetate, or cellulose acetate propionate. According to some embodiments, the substrate 100 may have a multi-layer structure including a base layer including the polymer resin and a barrier layer. The substrate 100 including the polymer resin may be flexible, rollable, or bendable.

The buffer layer 111 may be located on the substrate 100. The buffer layer 111 may include an inorganic insulating material such as silicon nitride, silicon oxynitride, or silicon oxide, and may have a single or multi-layer structure including the above-described inorganic insulating material.

The pixel circuit layer PCL may be located on the buffer layer 111. The pixel circuit layer PCL may include a thin-film transistor TFT included in a pixel circuit, and an inorganic insulating layer IIL, a first planarization layer 115, and a second planarization layer 116 located under and/or over elements of the thin-film transistor TFT. The inorganic insulating layer IIL may include a first gate insulating layer 112, a second gate insulating layer 113, and an interlayer insulating layer 114.

The thin-film transistor TFT may include a semiconductor layer A, and the semiconductor layer A may include polysilicon. Alternatively, the semiconductor layer A may include amorphous silicon, an oxide semiconductor, or an organic semiconductor. The semiconductor layer A may include a channel region, and a drain region and a source region located on both sides of the channel region. A gate electrode G may overlap the channel region.

The gate electrode G may include a low-resistance metal material. The gate electrode G may include a conductive material including molybdenum (Mo), aluminum (Al), copper (Cu), or titanium (Ti), and may have a single or multi-layer structure including the above-described material.

The first gate insulating layer 112 between the semiconductor layer A and the gate electrode G may include an inorganic insulating material such as silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_x$). Zinc oxide ($ZnO_x$) may be zinc oxide (ZnO) and/or zinc peroxide ($ZnO_2$).

The second gate insulating layer 113 may cover the gate electrode G. The second gate insulating layer 113 may include an inorganic insulating material such as silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_x$), like the first gate insulating layer 112. Zinc oxide ($ZnO_x$) may be zinc oxide (ZnO) and/or zinc peroxide ($ZnO_2$).

An upper electrode CE2 of a storage capacitor Cst may be located on the second gate insulating layer 113. The upper electrode CE2 may overlap the gate electrode G that is located below the upper electrode CE2. In this case, the gate electrode G and the upper electrode CE2 overlapping each other with the second gate insulating layer 113 therebetween may constitute the storage capacitor Cst. That is, the gate electrode G may function as a lower electrode CE1 of the storage capacitor Cst. As such, the storage capacitor Cst and the thin-film transistor TFT may overlap each other. Alternatively, the storage capacitor Cst may not overlap the thin-film transistor TFT.

The upper electrode CE2 may include aluminum (Al), platinum (Pt), palladium (Pd), silver (Ag), magnesium (Mg), gold (Au), nickel (Ni), neodymium (Nd), iridium (Ir), chromium (Cr), calcium (Ca), molybdenum (Mo), titanium (Ti), tungsten (W), and/or copper (Cu), and may have a single or multi-layer structure including the above material.

The interlayer insulating layer 114 may cover the upper electrode CE2. The interlayer insulating layer 114 may include silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_x$). Zinc oxide ($ZnO_x$) may be zinc oxide (ZnO) and/or zinc peroxide ($ZnO_2$). The interlayer insulating layer 114 may have a single or multi-layer structure including the above inorganic insulating material.

Each of a drain electrode D and a source electrode S may be located on the interlayer insulating layer 114. Each of the drain electrode D and the source electrode S may include a material having excellent conductivity. Each of the drain electrode D and the source electrode S may include a conductive material including molybdenum (Mo), aluminum (Al), copper (Cu), or titanium (Ti), and may have a single or multi-layer structure including the above material. According to some embodiments, each of the drain electrode D and the source electrode S may have a multi-layer structure including Ti/Al/Ti.

The first planarization layer 115 may cover the drain electrode D and the source electrode S. The first planarization layer 115 may include an organic insulating layer. The first planarization layer 115 may include an organic insulating material such as a general-purpose polymer (e.g., polymethyl methacrylate (PMMA) or polystyrene (PS)), a polymer derivative having a phenol-based group, an acrylic polymer, an imide-based polymer, an aryl ether-based polymer, an amide-based polymer, a fluorinated polymer, a p-xylene-based polymer, a vinyl alcohol-based polymer, or a blend thereof.

A connection electrode CML may be located on the first planarization layer 115. In this case, the connection electrode CML may be connected to the drain electrode D or the source electrode S through a contact hole defined in the first planarization layer 115. The connection electrode CML may include a material having excellent conductivity. The connection electrode CML may include a conductive material including molybdenum (Mo), aluminum (Al), copper (Cu), or titanium (Ti), and may have a single or multi-layer structure including the above material. According to some embodiments, the connection electrode CML may have a multi-layer structure including Ti/Al/Ti.

The second planarization layer 116 may cover the connection electrode CML. The second planarization layer 116 may include an organic insulating layer. The second planarization layer 116 may include an organic insulating material such as a general-purpose polymer (e.g., polymethyl methacrylate (PMMA) or polystyrene (PS)), a polymer derivative having a phenol-based group, an acrylic polymer, an imide-based polymer, an aryl ether-based polymer, an amide-based polymer, a fluorinated polymer, a p-xylene-based polymer, a vinyl alcohol-based polymer, or a blend thereof.

The display element layer DEL may be located on the pixel circuit layer PCL. The display element layer DEL may include a display element DE. The display element DE may be an organic light-emitting diode OLED. A pixel electrode 211 of the display element DE may be electrically connected to the connection electrode CML through a contact hole defined in the second planarization layer 116.

The pixel electrode 211 may include a conductive oxide such as indium tin oxide (ITO), indium zinc oxide (IZO), zinc oxide (ZnO), indium oxide ($In_2O_3$), indium gallium oxide (IGO), or aluminum zinc oxide (AZO). According to some embodiments, the pixel electrode 211 may include a reflective film including silver (Ag), magnesium (Mg), aluminum (Al), platinum (Pt), palladium (Pd), gold (Au), nickel (Ni), neodymium (Nd), iridium (Ir), chromium (Cr), or a compound thereof. Alternatively, the pixel electrode 211 may further include a film formed of indium tin oxide (ITO), indium zinc oxide (IZO), zinc oxide (ZnO), or indium oxide ($In_2O_3$) over/under the reflective film.

A pixel-defining film 118 having an opening 118OP through which a central portion of the pixel electrode 211 is exposed may be located on the pixel electrode 211. The pixel-defining film 118 may include an organic insulating material and/or an inorganic insulating material. The opening 118OP may define an emission area EA of light emitted by the display element DE. For example, a width of the opening 118OP may correspond to a width of the emission area EA of the display element DE.

According to some embodiments, the pixel-defining film 118 may include a light-blocking material, and may be black. The light-blocking material may include carbon black, carbon nanotubes, a resin or paste including a black dye, metal particles such as nickel, aluminum, molybdenum, or an alloy thereof, metal oxide particles (e.g., chromium oxide), or metal nitride particles (e.g., chromium nitride). When the pixel-defining film 118 includes the light-blocking material, reflection of external light by metal structures located under the pixel-defining film 118 may be reduced.

A spacer 119 may be located on the pixel-defining film 118. The spacer 119 may prevent or reduce damage to the substrate 100, in a method of manufacturing a display apparatus. A mask sheet may be used to manufacture the display panel 10, and in this case, the spacer may prevent or reduce the problem that the mask sheet is introduced into the opening 118OP of the pixel-defining film 118 or is closely attached to the pixel-defining film 118 and thus a part of the substrate 100 is damaged by the mask sheet when a deposition material is deposited on the substrate 100.

The spacer 119 may include an organic insulating material such as polyimide. Alternatively, the spacer 119 may include an inorganic insulating material such as silicon nitride or silicon oxide, or may include an organic insulating material and an inorganic insulating material.

According to some embodiments, the spacer 119 may include a material different from that of the pixel-defining film 118. Alternatively, the spacer 119 may include the same material as that of the pixel-defining film 118, and in this case, the pixel-defining film 118 and the spacer 119 may be formed together in a mask process using a halftone mask or the like.

An intermediate layer 212 may be located on the pixel-defining film 118. The intermediate layer 212 may include an emission layer 212b located in the opening 118OP of the pixel-defining film 118. The emission layer 212b may include a high molecular weight organic material or a low molecular weight organic material emitting light of a certain color.

A first functional layer 212a and a second functional layer 212c may be respectively located under and over the emission layer 212b. The first functional layer 212a may include, for example, a hole transport layer (HTL), or may include an HTL and a hole injection layer (HIL). The second functional layer 212c located over the emission layer 212b may be optional. The second functional layer 212c may include an electron transport layer (ETL) and/or an electron injection layer (EIL). The first functional layer 212a and/or the second functional layer 212c may be a common layer entirely covering the substrate 100, like a common layer (or counter electrode) 213 described below.

The counter electrode 213 may be formed of a conductive material having a low work function. For example, the counter electrode 213 may include a (semi)transparent layer including silver (Ag), magnesium (Mg), aluminum (Al), platinum (Pt), palladium (Pd), gold (Au), nickel (Ni), neodymium (Nd), iridium (Ir), chromium (Cr), lithium (Li), calcium (Ca), or an alloy thereof. Alternatively, the counter electrode 213 may further include a layer formed of ITO, IZO, ZnO, or $In_2O_3$ on the (semi)transparent layer including the above material.

In some embodiments, a capping layer may be further located on the counter electrode 213. The capping layer may include LiF, an inorganic material, and/or an organic material.

The encapsulation layer 300 may be located on the counter electrode 213. According to some embodiments, the encapsulation layer 300 may include at least one inorganic encapsulation layer and at least one organic encapsulation layer. In FIG. 3, the encapsulation layer 300 includes a first inorganic encapsulation layer 310, an organic encapsulation layer 320, and a second inorganic encapsulation layer 330 that are sequentially stacked.

Each of the first and second inorganic encapsulation layers 310 and 330 may include at least one inorganic material from among aluminum oxide, titanium oxide, tantalum oxide, hafnium oxide, zinc oxide, silicon oxide, silicon nitride, and silicon oxynitride. The organic encapsulation layer 320 may include a polymer-based material. Examples of the polymer-based material may include an acrylic resin, an epoxy resin, polyimide, and polyethylene. According to some embodiments, the organic encapsulation layer 320 may include acrylate.

According to some embodiments, a touch sensor layer may be located on the encapsulation layer 300. The touch sensor layer may obtain coordinate information according to an external input, for example, a touch event. Although the following is described assuming that the display panel 10 includes the touch sensor layer, the disclosure is not limited thereto and the touch sensor layer may be omitted.

Figure 4:
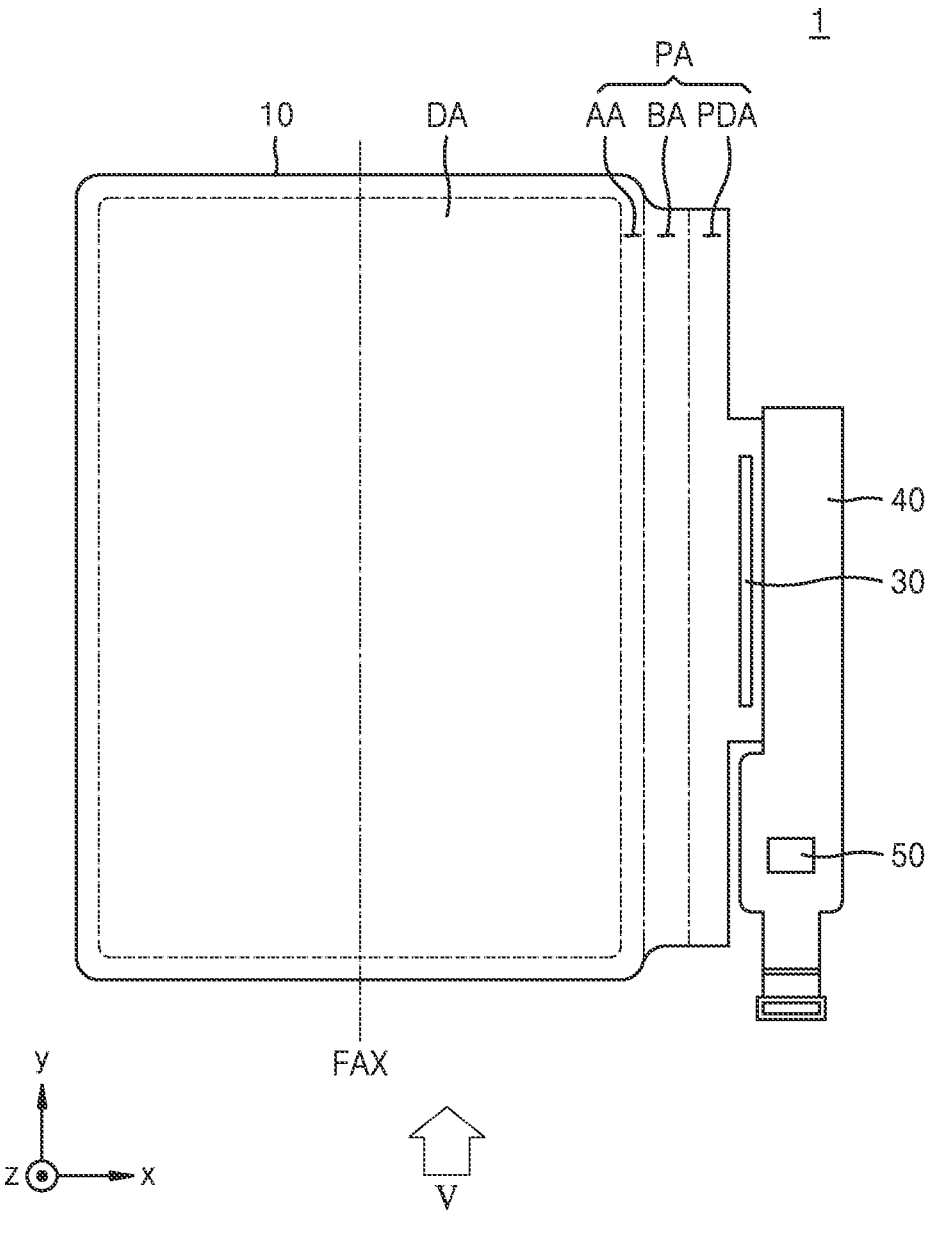
FIG. 4 is a plan view schematically illustrating a portion of a display apparatus, according to some embodiments.
Figure 5:
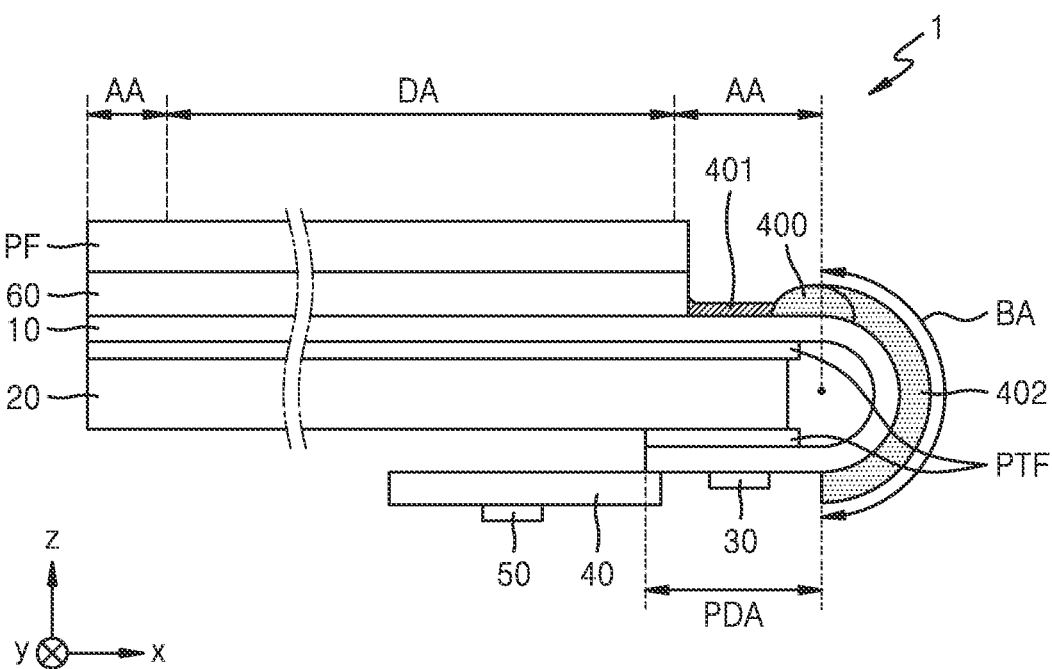
FIGS. 5 and 6 are side views schematically illustrating a display apparatus including elements of FIG. 4 according to some embodiments.
Figure 6:
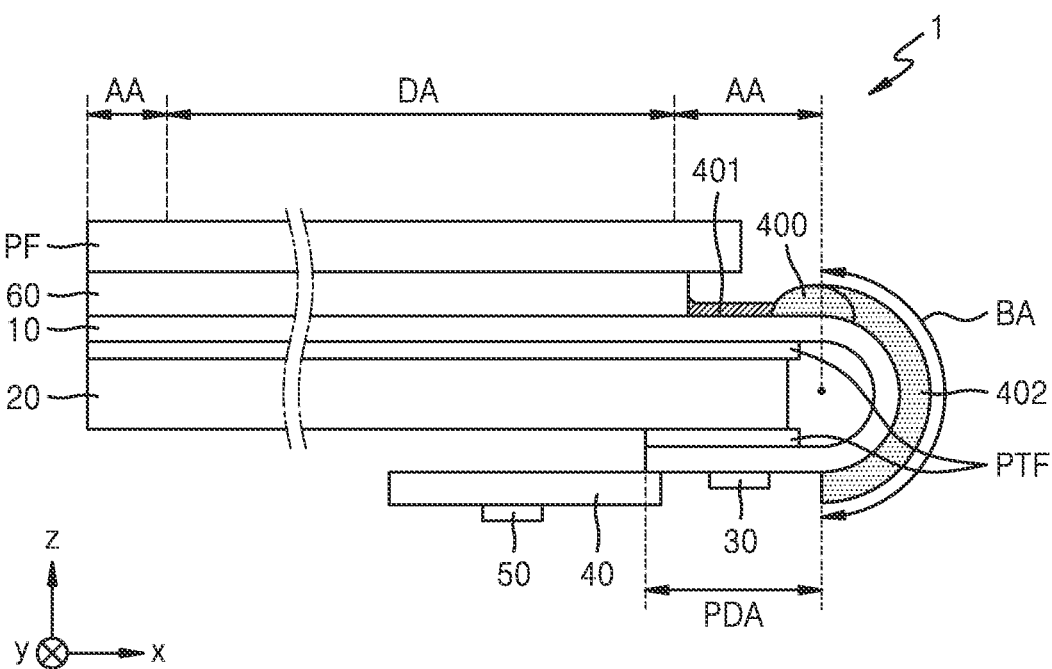

FIG. 4 is a plan view schematically illustrating a portion of a display apparatus, according to some embodiments. FIGS. 5 and 6 are side views schematically illustrating a display apparatus including elements of FIG. 4. FIGS. 5 and 6 are views illustrating a display apparatus viewed in a direction V of FIG. 4. Also, FIGS. 5 and 6 illustrate a state in which the display panel 10 is flexible and is bent in a bending area BA.

Referring to FIGS. 4, 5, and 6, the display apparatus 1 may include the display panel 10, an optical functional layer 60, a first protective film PF, a display driver 30, a display circuit board 40, a touch sensor driver 50, a cushion layer 20, a second protective film PTF, an organic material layer 401, and a bending protective layer 402.

The display panel 10 may display information processed by the display apparatus 1. For example, the display panel 10 may display execution screen information of an application driven by the display apparatus 1 or user interface (UI) or graphical user interface (GUI) information according to the execution screen information.

The display panel 10 may include a display element. For example, the display panel 10 may be an organic light-emitting display panel using an organic light-emitting diode, a micro light-emitting diode display panel using a micro light-emitting diode (LED), a quantum dot light-emitting display panel using a quantum dot light-emitting diode including a quantum dot emission layer, or an inorganic light-emitting display panel using an inorganic light-emitting device including an inorganic semiconductor. The following will be described in more detail assuming that the display panel 10 is an organic light-emitting display panel using an organic light-emitting diode as a display element.

As described above, the display panel 10 may include the display area DA and the peripheral area PA. The peripheral area PA may include an adjacent area AA adjacent to the display area DA and surrounding the display area DA, the bending area BA extending from a side of the adjacent area AA and being bendable, and a pad area PDA connected to the bending area BA and allowing drivers for applying a scan signal or a data signal to be located therein.

According to some embodiments, the bending area BA may extend from a portion, through which the folding axis FAX does not pass, from among portions of the adjacent area AA surrounding the display area DA. In other words, as shown in FIG. 4, the bending area BA may extend in the first direction (e.g., the x direction) from one of portions, extending in the second direction (e.g., the y direction or the −y direction), of the adjacent area surrounding the display area DA, In other words, the bending area BA may be spaced apart from the folding axis FAX in the first direction (e.g., the x direction).

The display panel 10 may be bent in the bending area BA. In this case, at least parts of a bottom surface of the display panel 10 may face each other, and the pad area PDA of the display panel 10 may be located below other portions of the display panel 10 (in the −z direction of FIG. 6). Accordingly, the area of the peripheral area PA visible to a user may be reduced.

The optical functional layer 60 may be located on the display panel 10. The optical functional layer 60 may reduce a reflectance of light (external light) incident on the display apparatus, and/or improve color purity of light emitted from the display apparatus. According to some embodiments, the optical functional layer 60 may include a phase retarder and/or a polarizer.

The phase retarder may be a film-type phase retarder or a liquid crystal coating-type phase retarder, and may include a λ/2 phase retarder and/or a λ/4 phase retarder. The polarizer may also be a film-type polarizer or a liquid crystal coating-type polarizer. The film-type polarizer may include a stretchable synthetic resin film, and the liquid crystal coating-type polarizer may include liquid crystals arranged in a certain arrangement. The phase retarder and the polarizer may further include a protective film.

The display driver 30 may be located in the pad area PDA. The display driver 30 may receive control signals and power supply voltages, and may generate and output signals and voltages for driving the display panel 10. The display driver 30 may include an integrated circuit (IC).

The display circuit board 40 may be electrically connected to the display panel 10. For example, the display circuit board 40 may contact the pad area PDA of the display panel 10, or may be electrically connected to the pad area PDA of the display panel 10 by an anisotropic conductive film.

The display circuit board 40 may be a flexible printed circuit board (FPCB) that is bendable, or may be a rigid printed circuit board (PCB) that is rigid and is not easily bent. Alternatively, according to some embodiments, the display circuit board 40 may be a hybrid printed circuit board including both a rigid printed circuit board and a flexible printed circuit board.

According to some embodiments, the touch sensor driver 50 may be located on the display circuit board 40. The touch sensor driver 50 may include an integrated circuit. The touch sensor driver 50 may be attached to the display circuit board 40. The touch sensor driver 50 may be electrically connected to sensor electrodes of a touch sensor layer of the display panel 10 through the display circuit board 40.

In addition, a power supply unit may be additionally located on the display circuit board 40. The power supply unit may supply a driving voltage for driving pixels of the display panel 10 and the display driver 30.

The second protective film PTF may be patterned and may be attached to the bottom surface of the display panel 10. In this case, the second protective film PTF may be attached to a portion other than the bending area BA. As the display panel 10 is bent in the bending area BA, a portion and another portion of the second protective film PTF may face each other.

According to some embodiments, the first protective film PF may be located on the optical functional layer 60. The optical functional layer 60 and the first protective film PF may be sequentially located on the display panel 10. The optical functional layer 60 and the first protective film PF may be located on the display panel 10 in the display area DA.

According to some embodiments, in the display area DA, the optical functional layer 60 and the first protective film PF may extend in the first direction (e.g., the x direction or the −x direction). In the adjacent area AA extending to the bending area BA, the optical functional layer 60 and the first protective film PF extending in the first direction (e.g., the x direction) in the display area DA may be disconnected.

According to some embodiments, when the adjacent area AA in which the optical functional layer 60 and the first protective film PF do not extend is viewed from a cross-section (e.g., an xz cross-section) in a third direction (e.g., the z direction or the −z direction), an end of the optical functional layer 60 and an end of the first protective film PF may be aligned with each other.

Alternatively, when the adjacent area AA in which the optical functional layer 60 and the first protective film PF do not extend is viewed from the cross-section (e.g., the xz cross-section) in the third direction (e.g., the z direction), an end of the first protective film PF may further protrude toward the bending area BA than an end of the optical functional layer 60.

According to some embodiments, the cushion layer 20 may be located between the second protective films PTF. The cushion layer 20 may absorb external impact to prevent or reduce damage to the display panel 10. The cushion layer 20 may be formed of a polymer resin such as polyurethane, polycarbonate, polypropylene, or polyethylene, or may include an elastic material such as a sponge which is provided by foaming a rubber, a urethane-based material, or an acrylic material.

According to some embodiments, the organic material layer 401 may be located in the adjacent area AA of the display panel 10. The organic material layer 401 may be located between the optical functional layer 60 and a dam 400. The organic material layer 401 may be formed of a first material 515 (see FIG. 7). The organic material layer 401 may fill a space between the optical functional layer 60 and the dam 400 in order not to expose a top surface of the display panel 10 between the optical functional layer 60 and the dam 400. The organic material layer 401 may protect the adjacent area AA and/or the display area DA from electrostatic discharge (ESD). A plurality of signal lines toward the display circuit board 40 may be located in the adjacent area AA, the bending area BA, and the pad area PDA of the display panel 10. In this case, the signal lines may be damaged due to external ESD. Here, ESD refers to a sudden and momentary flow of electric current between two differently-charged objects caused by contact. Leakage current or the like due to ESD may cause malfunction and defects of the display panel 10 and the display circuit board 40. According to some embodiments, ESD may be effectively prevented or reduced by the organic material layer 401.

According to some embodiments, the bending protective layer 402 may be located in the bending area BA of the display panel 10. The bending protective layer 402 may be formed of a second material 525 (see FIG. 7) different from the first material 515 (see FIG. 7). The bending protective layer 402 may be spaced apart from the optical functional layer 60 in the first direction (e.g., the x direction). According to some embodiments, a connection wiring may be located in the bending area BA of the substrate 100. The connection wiring may transmit a signal provided by the display driver 30 to the display area DA. The bending protective layer 402 for protecting the connection wiring may be a stress neutralization layer. The bending protective layer 402 may function as a black matrix as well as the stress neutralization layer.

According to some embodiments, the dam 400 may be located in at least a part of the adjacent area AA and at least a part of the bending area BA. In other words, the dam 400 may be located between the adjacent area AA and the bending area BA. The dam 400 may be formed of the second material 525 (see FIG. 9). The dam 400 located in the adjacent area AA and the bending area BA may prevent or reduce the second material 525 applied to the bending area BA from passing over to the adjacent area AA, and may prevent or reduce the first material 515 applied to the adjacent area AA from passing over to the bending area BA.

Figure 7:
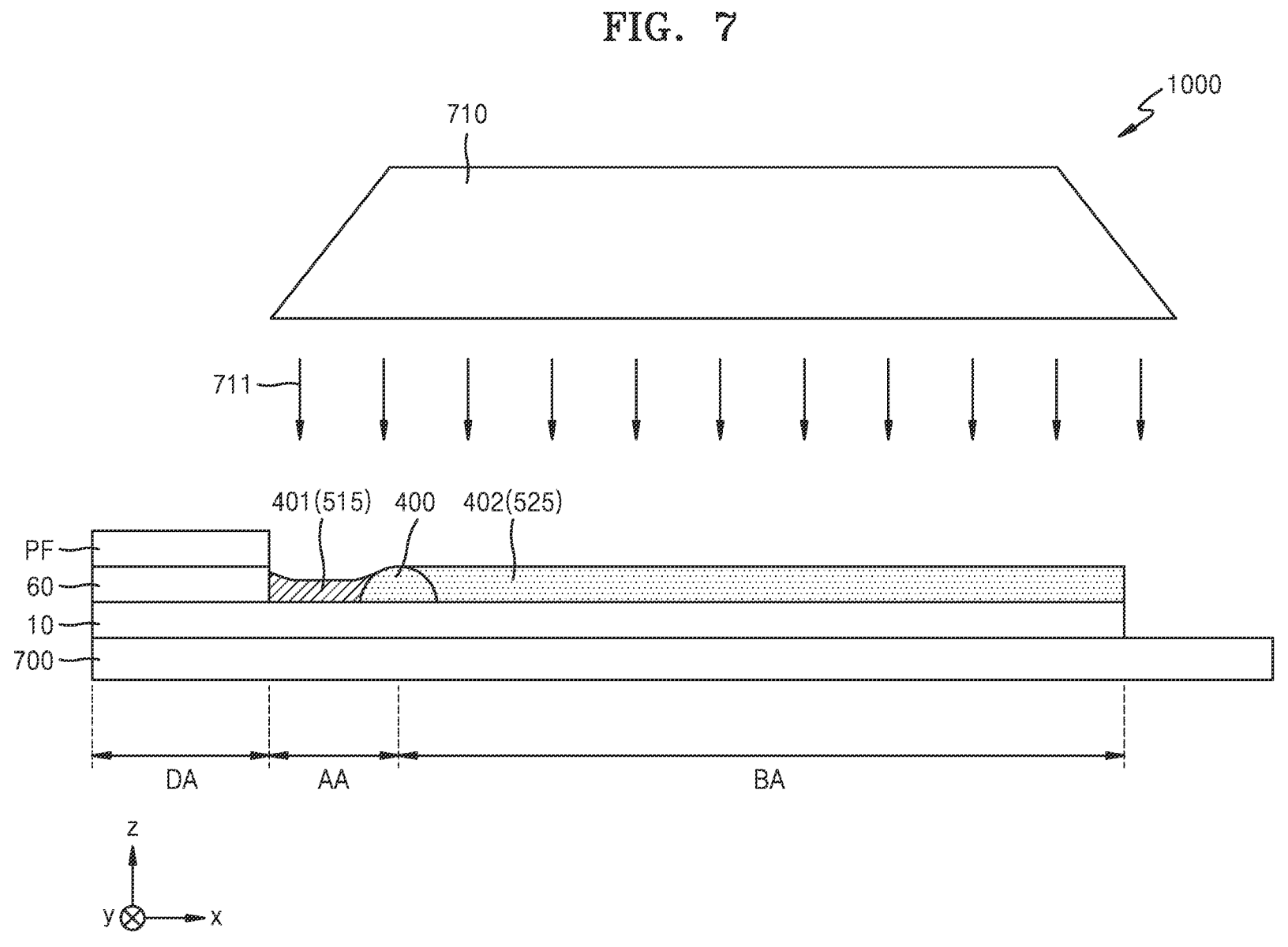
Figure 8:
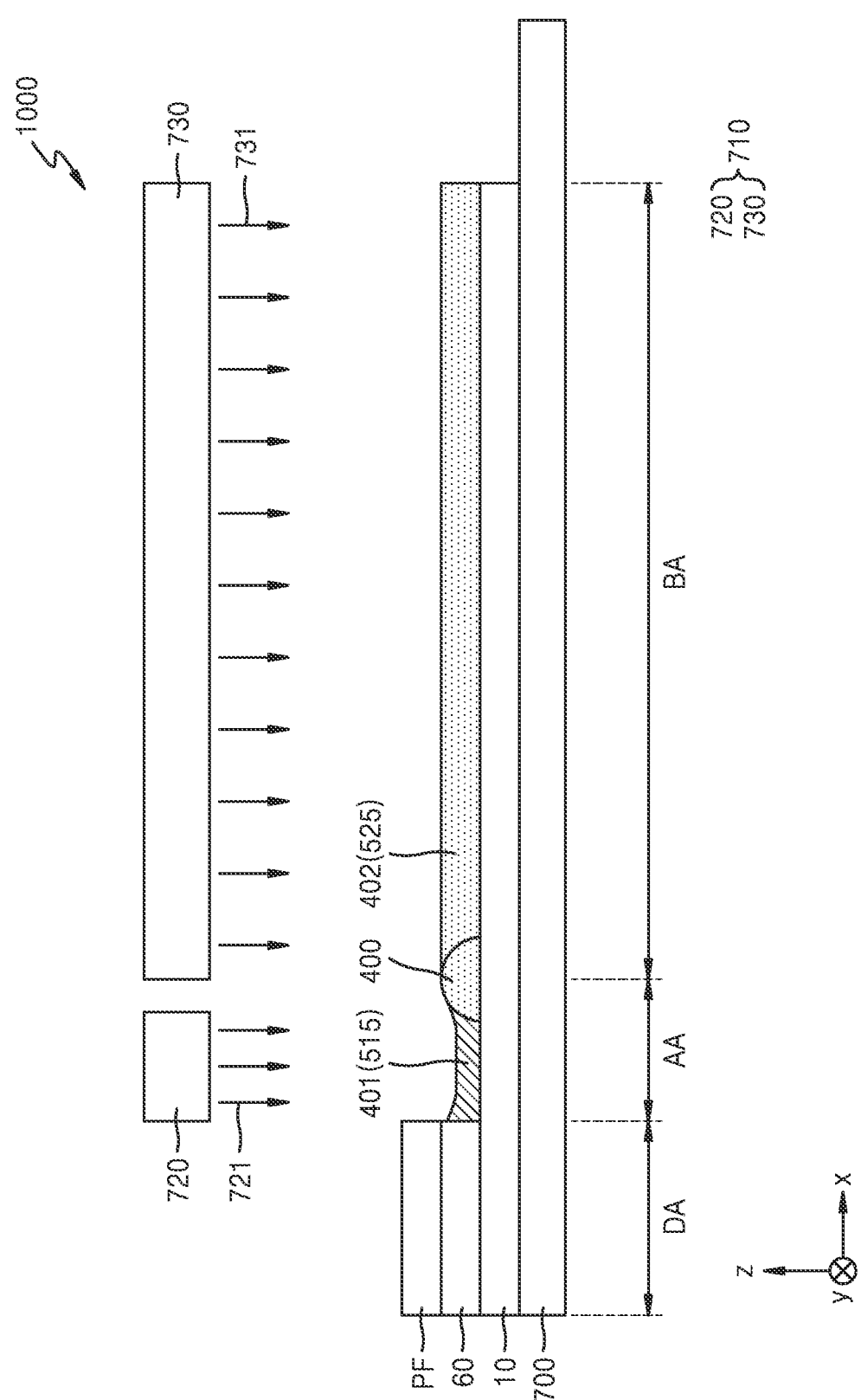

FIGS. 7 and 8 are cross-sectional views schematically illustrating an apparatus 1000 for manufacturing a display apparatus, according to some embodiments. FIGS. 7 and 8 schematically illustrate a step of simultaneously (or concurrently) curing the first material 515 and the second material 525 located on the display panel 10.

Referring to FIG. 7, the apparatus 1000 for manufacturing a display apparatus may include a stage 700 and a curing device 710 on the display panel 10. The display panel 10 may include the display area DA, the adjacent area AA, and the bending area BA. The display panel 10 located on the stage 700 may be arranged in the order of the display area DA, the adjacent area AA, and the bending area BA in the first direction (e.g., the x direction). In the display area DA of the display panel 10, the optical functional layer 60 and the first protective film PF may be located on the display panel 10.

The first material 515 may be applied to the adjacent area AA of the display panel 10. The first material 515 may entirely cover a top surface of the display panel 10 in the adjacent area AA. Accordingly, the top surface of the display panel 10 in the adjacent area AA may not be exposed.

The second material 525 may be applied to the bending area BA of the display panel 10. The dam 400 formed of the second material 525 (see FIG. 9) may be located in at least a part of the adjacent area AA and at least a part of the bending area BA of the display panel 10. The dam 400 may include a portion formed of the first material 515 in the adjacent area AA and a portion formed of the second material 525 in the bending area BA.

According to some embodiments, the curing device 710 may be a metal halide-type curing device. The metal halide-type curing device 710 may be a curing device that irradiates light generated by mixing metal vapor with a dissociative product of a halogen compound. The curing device 710 may cure the first material 515 and/or the second material 525 by irradiating ultraviolet rays. For example, the curing device 710 may irradiate first light 711. A main wavelength band of the first light 711 irradiated by the curing device 710 may be equal to or greater than 365 nm and equal to or less than 405 nm. However, the disclosure is not limited thereto.

An irradiation amount of the first light 711 irradiated by the curing device 710 may be determined so that a curing rate of the first material 515 applied to the adjacent area AA and the second material 525 applied to the bending area BA at a deep portion and a surface is equal to or greater than 80%. The first material 515 applied to the adjacent area AA may be cured by the first light 711 to form the organic material layer 401. At the same time, the second material 525 applied to the bending area BA may be cured by the first light 711 to form the bending protective layer 402.

Referring to FIG. 8, the apparatus 1000 for manufacturing a display apparatus may include the stage 700 and the curing devices 710 located on the display panel 10.

According to some embodiments, the curing devices 710 may include a first curing device 720 and a second curing device 730. The first curing device 720 and the second curing device 730 may be spaced apart from each other in the first direction (e.g., the x direction or the −x direction). The first curing device 720 may be located in the adjacent area AA of the display panel 10. The first curing device 720 may irradiate second light 721. The second curing device 730 may be located in the bending area BA of the display panel 10. The second curing device 730 may irradiate third light 731. A main wavelength band of the second light 721 and the third light 731 may be equal to or greater than 365 nm and equal to or less than 405 nm. However, the disclosure is not limited thereto.

An irradiation amount of the second light 721 may be determined so that a curing rate of the first material 515 applied to the adjacent area AA at a deep portion and a surface is equal to or greater than 80%. The first material 515 applied to the adjacent area AA may be cured by the second light 721 to form the organic material layer 401.

An irradiation amount of the third light 731 may be determined so that a curing rate of the second material 525 applied to the bending area BA at a deep portion and a surface is equal to or greater than 80%. The second material 525 applied to the bending area BA may be cured by the third light 731 to form the bending protective layer 402.

That is, the first material 515 applied to the adjacent area AA may be cured by the second light 721 irradiated by the first curing device 720 to form the organic material layer 401. Also, the second material 525 applied to the bending area BA may be cured by the third light 731 irradiated by the second curing device 730 to form the bending protective layer 402.

FIGS. 9 through 13 are cross-sectional views schematically illustrating a method of manufacturing the display apparatus 1, according to some embodiments. A method of manufacturing the display apparatus 1 will be described with reference to FIGS. 9 through 13.

Referring to FIGS. 9 through 12, a method of manufacturing the display apparatus 1 may include a step of locating, on the stage 700, the display panel 10 including the display area DA, the adjacent area AA surrounding the display area DA, and the bending area BA extending from a side of the adjacent area AA, a step of forming the dam 400 in at least a part of the bending area BA and at least a part of the adjacent area AA, a step of applying the first material 515 to the adjacent area AA, and a step of applying the second material 525 to the bending area BA.

Figure 9:
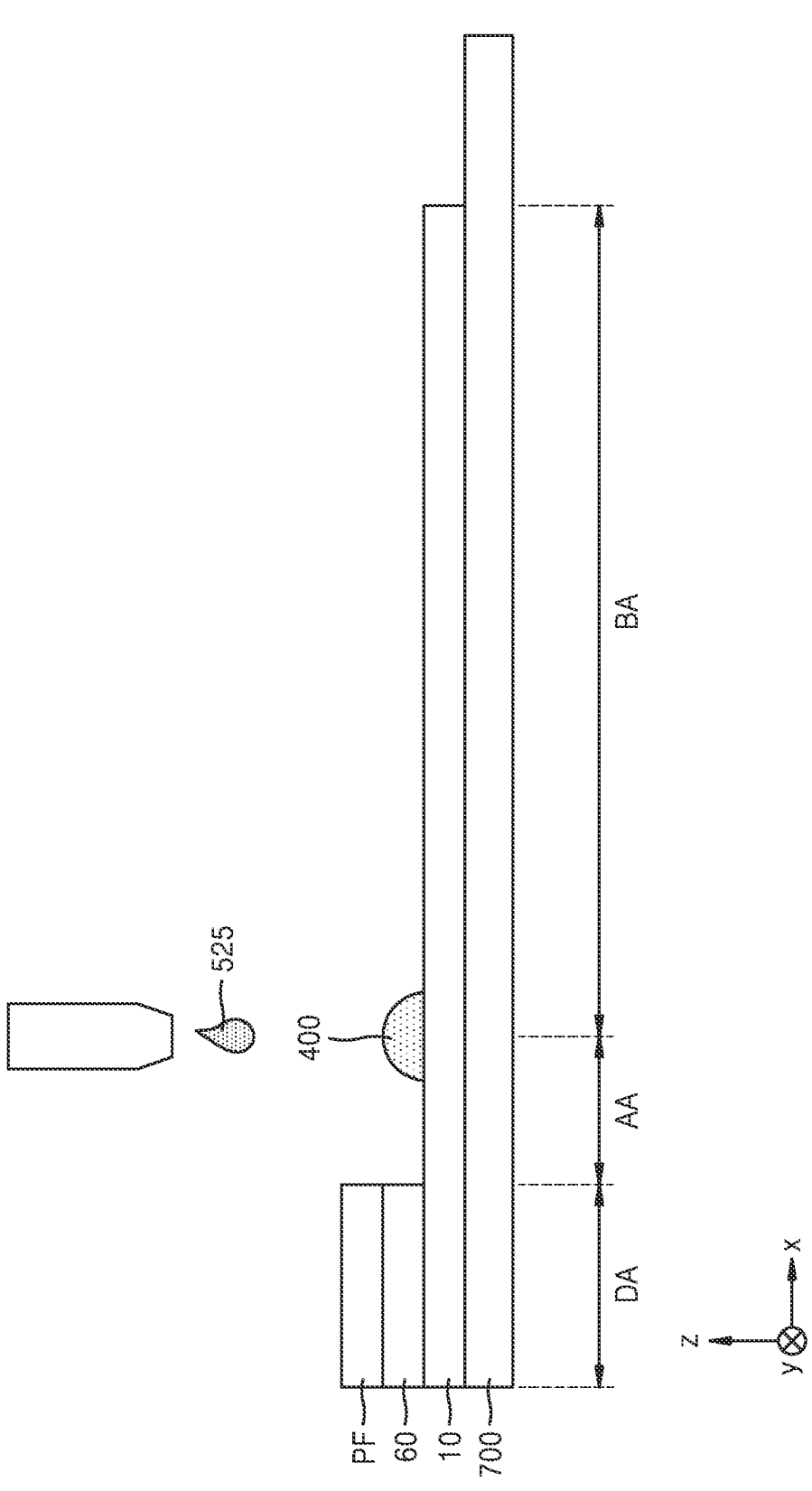

Referring to FIG. 9, first, the display panel 10 including the display area DA, the adjacent area AA surrounding the display area DA, and the bending area BA extending from a side of the adjacent area AA may be located on the stage 700. Next, the second material 525 may be applied to at least a part of the adjacent area AA and at least a part of the bending area BA. The second material 525 may be applied to at least a part of the adjacent area AA and at least a part of the bending area BA and may be temporarily cured (e.g., spot cured). The dam 400 formed of the second material 525 may be formed in at least a part of the adjacent area AA and at least a part of the bending area BA.

When the first material 515 is applied to the adjacent area AA, the dam 400 may prevent or reduce the first material 515 from passing over to the bending area BA. Also, when the second material 525 is applied to the bending area BA, the dam 400 may prevent or reduce the second material 525 from passing over to the adjacent area AA. The dam 400 may include a portion formed of the second material 525 in the bending area BA and a portion formed of the first material 515 in the adjacent area AA.

According to some embodiments, when the first material 515 applied to the adjacent area AA and the second material 525 applied to the bending area BA are mixed with each other, the first material 515 and the second material 525 may not be simultaneously (or concurrently) cured. The dam 400 may prevent or reduce the first material 515 and the second material 525 from being mixed with each other. Accordingly, the first material 515 applied to the adjacent area AA and the second material 525 applied to the bending area BA may be simultaneously (or concurrently) cured by the same curing device 710.

Figure 10:
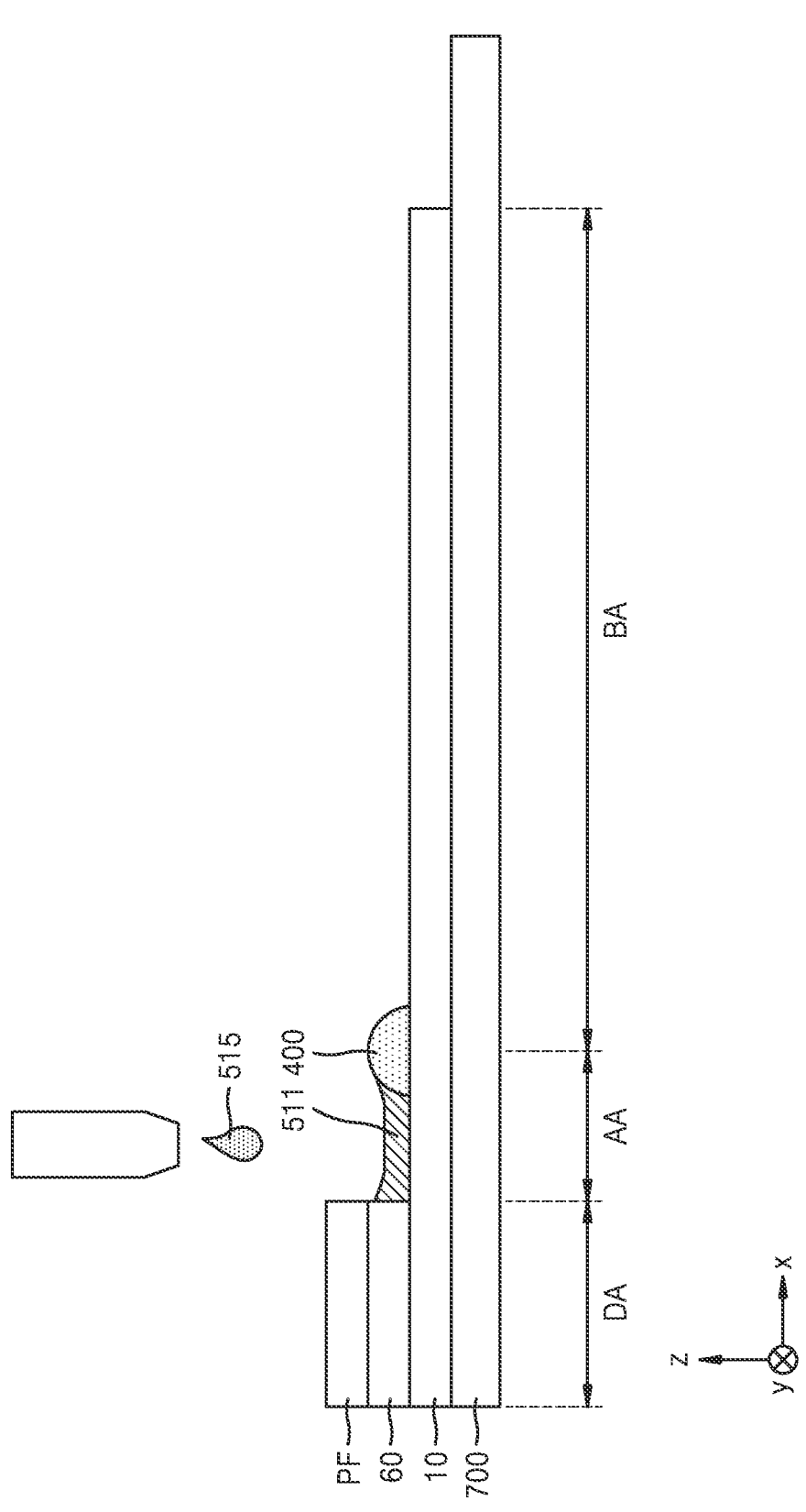

Referring to FIG. 10, after the dam 400 is formed in at least a part of the adjacent area AA and at least a part of the bending area BA, the first material 515 may be applied to the adjacent area AA. The first material 515 may fill a space between the display area DA and the dam 400 so that a top surface of the display panel 10 is not exposed. A first material layer 511 may be formed in the adjacent area AA of the display panel 10. In other words, the first material layer 511 may be a layer formed of the first material 515. The first material layer 511 may cover a top surface of the display panel 10 in the adjacent area AA so that the top surface of the display panel 10 in the adjacent area AA is not exposed.

Figure 11:
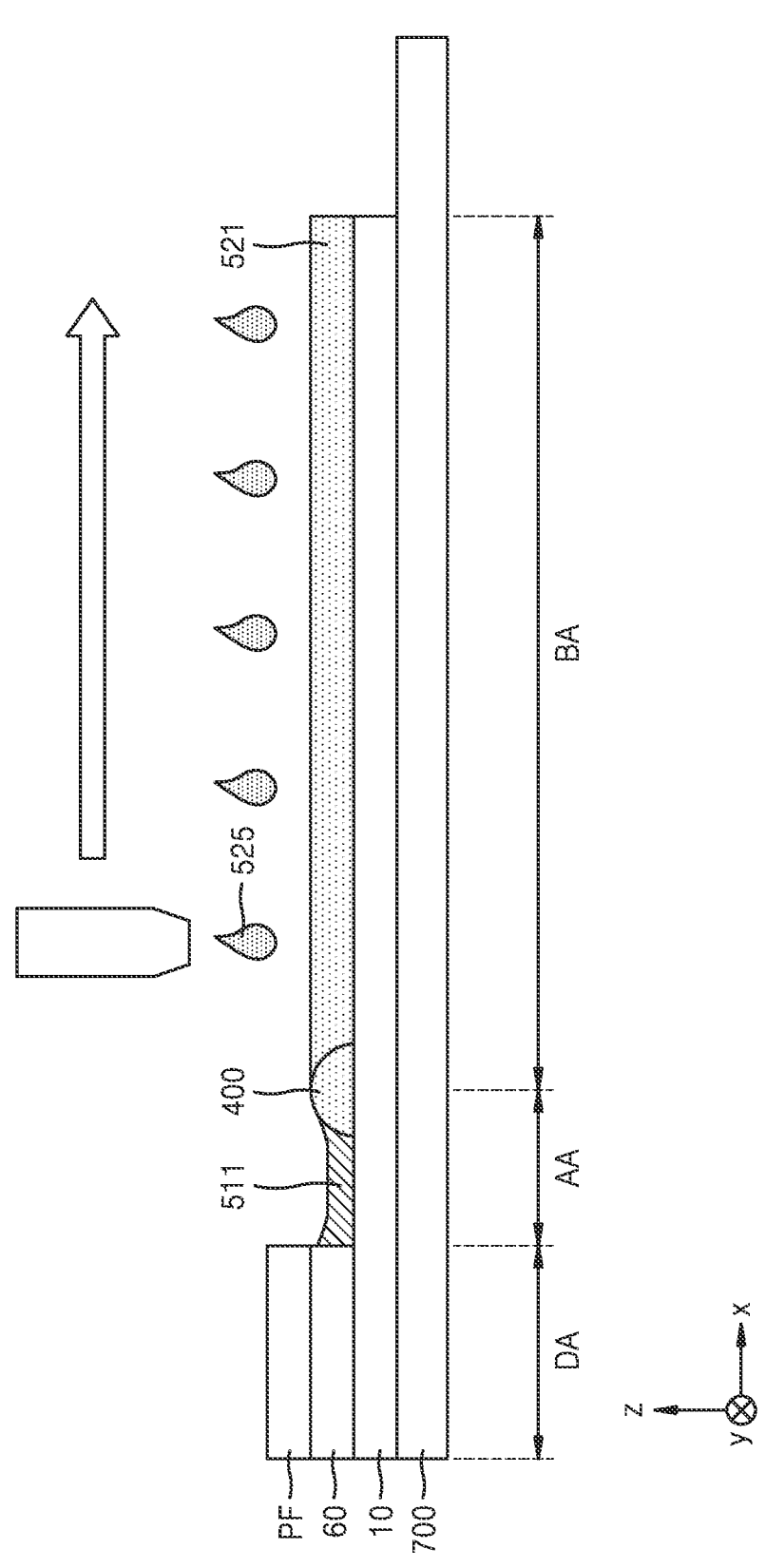

Referring to FIG. 11, after the first material 515 is applied to the adjacent area AA, the second material 525 may be applied to the bending area BA. A second material layer 521 may be formed in the bending area BA of the display panel 10. In other words, the second material layer 521 may be formed of the second material 525.

Figure 12:
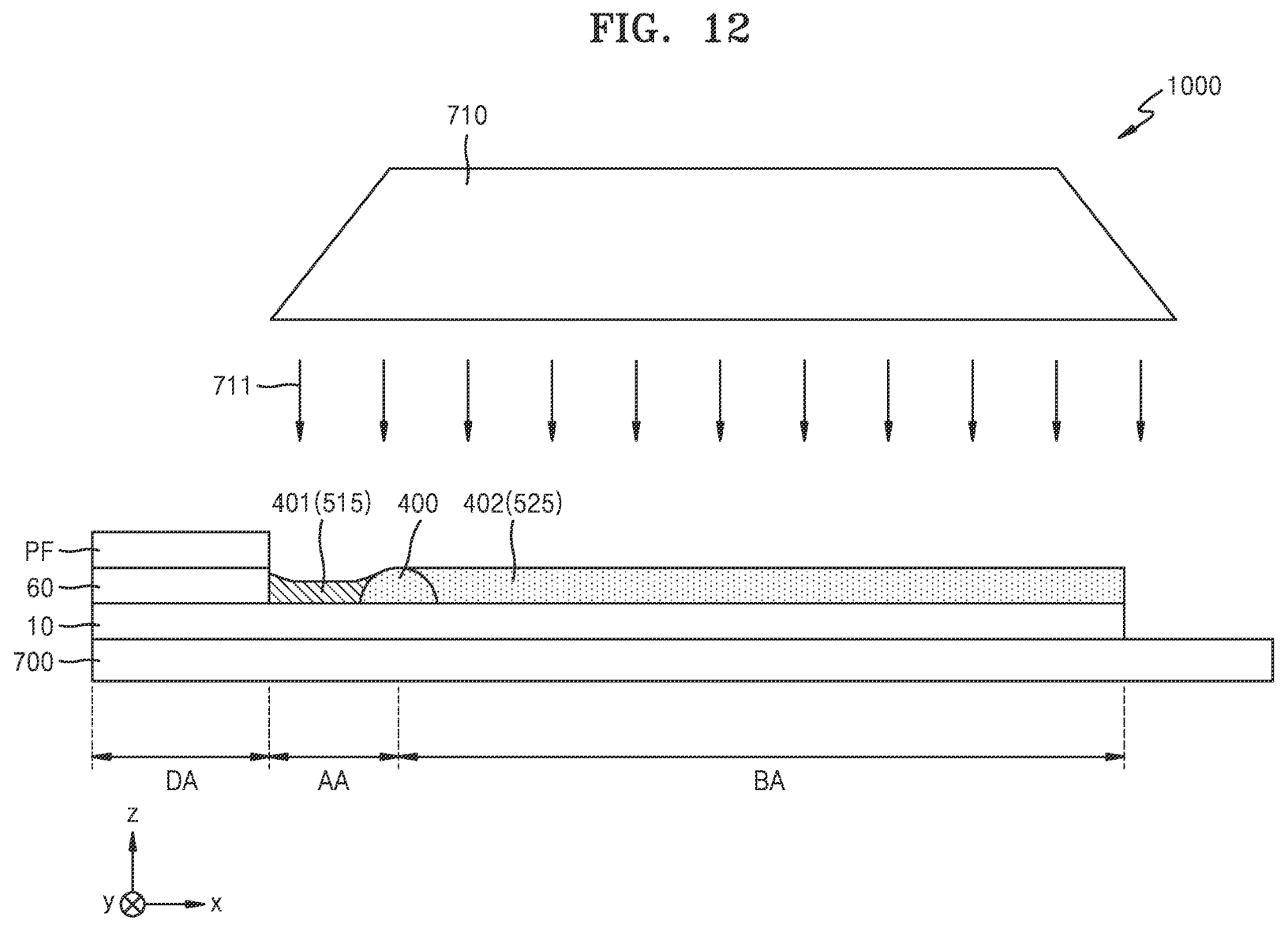
Figure 13:
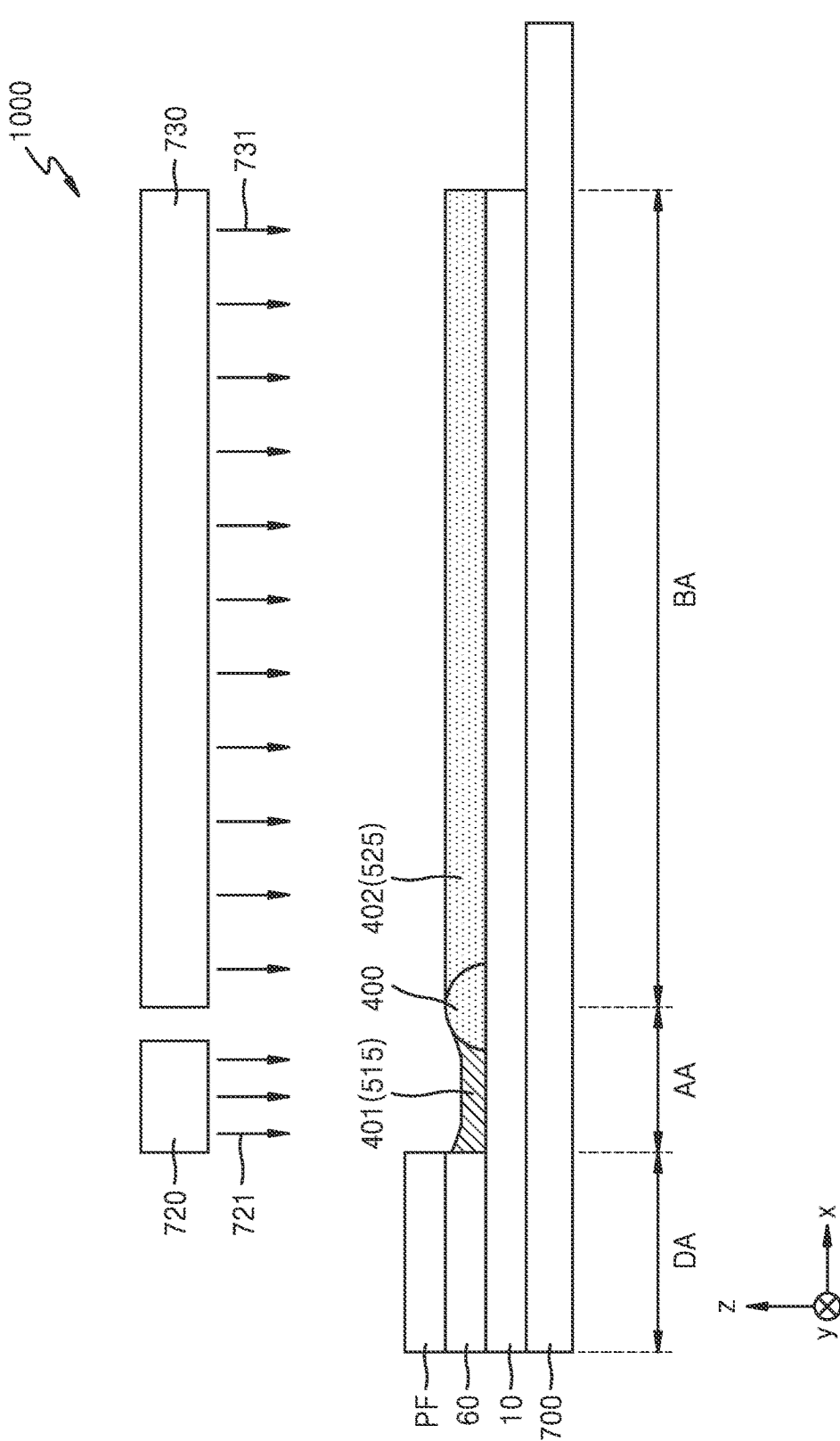

FIGS. 12 and 13 illustrate a step of simultaneously (or concurrently) curing the first material 515 applied to the adjacent area AA and the second material 525 applied to the bending area BA.

Referring to FIG. 12, after the first material 515 and the second material 525 are applied to the display panel 10, the curing device 710 may simultaneously (or concurrently) cure the first material 515 and the second material 525. In other words, the curing device 710 may simultaneously (or concurrently) cure the first material layer 511 (see FIG. 11) in the adjacent area AA and the second material layer 521 (see FIG. 11) in the bending area BA.

According to some embodiments, the curing device 710 may be located over the display panel 10. The curing device 710 may be a metal halide type-type curing device. The curing device 710 may irradiate the first light 711. A main wavelength band of the first light 711 may be equal to or greater than 365 nm and equal to or less than 405 nm. However, the disclosure is not limited thereto.

An irradiation amount of the first light 711 may be determined so that a curing rate of the first material 515 applied to the adjacent area AA and the second material 525 applied to the bending area BA at a deep portion and a surface is equal to or greater than 80%. The first material 515 applied to the adjacent area AA may be cured by the first light 711 to form the organic material layer 401. At the same time, the second material 525 applied to the bending area BA may be cured to form the bending protective layer 402, Referring to FIG. 13, the first curing device 720 may cure the first material 515 applied to the adjacent area AA, and at the same time, the second curing device 730 may cure the second material 525 applied to the bending area BA. In other words, the first curing device 720 may cure the first material layer 511 in the adjacent area AA while the second curing device 730 may cure the second material layer 521 in the bending area BA.

According to some embodiments, the curing devices 710 may be located over the display panel 10. The curing devices 710 may include the first curing device 720 and the second curing device 730. The first curing device 720 and the second curing device 730 may be spaced apart from each other in the first direction (e.g., the x direction or the −x direction). The first curing device 720 may be located in the adjacent area AA. The first curing device 720 may irradiate the second light 721. The second curing device 730 may be located in the bending area BA. The second curing device 730 may irradiate the third light 731. A main wavelength band of the second light 721 and the third light 731 may be equal to or greater than 365 nm and equal to or less than 405 nm. However, the disclosure is not limited thereto.

An irradiation amount of the second light 721 may be determined so that a curing rate of the first material 515 applied to the adjacent area AA at a deep portion and a surface is equal to or greater than 80%. The first material 515 applied to the adjacent area AA may be cured by the second light 721 to form the organic material layer 401. An irradiation amount of the third light 731 may be determined so that a curing rate of the second material 525 applied to the bending area BA at a deep portion and a surface is equal to or greater than 80%. The second material 525 applied to the bending area BA may be cured by the third light 731 to form the bending protective layer 402.

According to some embodiments, the first material 515 applied to the adjacent area AA may be cured by the second light 721 to form the organic material layer 401. At the same time, the second material 525 applied to the bending area BA may be cured by the third light 731 to form the bending protective layer 402.

According to the above description, after the first material 515 and the second material 525 are applied to the display panel 10, the display panel 10 may be moved to a curing zone once to simultaneously (or concurrently) cure the first material 515 and the second material 525. In other words, a step of moving the display panel 10 to the curing zone may be reduced. A movement time of the display panel 10 may be reduced.

In the related art, in order to form the organic material layer 401 and the bending protective layer 402 on the display panel 10, the first material 515 may be applied to the adjacent area AA of the display panel 10 and then moved to the curing zone, and the second material 525 may be applied to the bending area BA and then moved to the curing zone. Accordingly, it takes a time to move logistics in a manufacturing process.

As described above, according to some embodiments, after the first material 515 and the second material 525 are respectively applied to the adjacent area AA and the bending area BA, the display panel 10 may be moved to the curing zone once to simultaneously (or concurrently) cure the first material 515 and the second material 525 by the same curing device 710.

Alternatively, after the first material 515 and the second material 525 are respectively applied to the adjacent area AA and the bending area BA, the first material 515 and the second material 525 applied to the display panel 10 may be simultaneously (or concurrently) cured by using the apparatus 1000 for manufacturing a display apparatus provided with both the first curing device 720 for curing the first material 515 and the second curing device 730 for curing the second material 525.

As described above, because the first material 515 and the second material 525 may be simultaneously (or concurrently) cured, a step of moving the display panel 10 to the curing zone may be reduced. That is, a movement time of logistics may be reduced.

While an apparatus and method for manufacturing a display apparatus have been mainly described, the disclosure is not limited thereto.

According to some embodiments, a movement time of logistics may be reduced by simultaneously (or concurrently) curing materials applied to a display panel by using the same curing device or curing devices that are spaced apart from each other. However, the scope of the disclosure is not limited by these effects.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by one of ordinary skill in the art that various changes in form and details may be made therein without departing from the spirit and scope as defined by the following claims, and their equivalents.

What is claimed is:

1. A method of manufacturing a display apparatus, the method comprising:

locating, on a stage, a display panel comprising a display area, an adjacent area surrounding the display area, and a bending area extending from a side of the adjacent area, such that the adjacent area is between the display panel and the bending area;

forming a dam in at least a part of the adjacent area and at least a part of the bending area;

applying a first material to the adjacent area;

applying a second material to the bending area; and concurrently curing the first material and the second material.

2. The method of claim 1, wherein the dam comprises a same material as the second material.

3. The method of claim 1, wherein the applying of the first material to the adjacent area comprises covering a top surface of the display panel with the first material so that the top surface of the display panel in the adjacent area is not exposed.

4. The method of claim 1, wherein the first material and the second material are concurrently cured by one curing device.

5. The method of claim 4, wherein a wavelength band of light irradiated by the curing device is equal to or greater than 365 nm and equal to or less than 405 nm.

6. The method of claim 5, wherein an irradiation amount of light irradiated by the curing device is determined so that a curing rate of the first material in the adjacent area and the second material in the bending area at a deep portion and a surface is equal to or greater than 80%.

7. The method of claim 1, wherein the first material is cured by a first curing device and the second material is cured by a second curing device.

8. The method of claim 7, wherein the first curing device and the second curing device are spaced apart from each other in a first direction.

9. The method of claim 7, wherein a wavelength band of light irradiated by the first curing device and the second curing device is equal to or greater than 365 nm and equal to or less than 405 nm, wherein an irradiation amount of light irradiated by the first curing device and the second curing device is determined so that a curing rate of the first material and the second material at a deep portion and a surface is equal to or greater than 80%.

* * * * *